United States Patent
Cheung et al.

(10) Patent No.: US 9,934,007 B2
(45) Date of Patent: Apr. 3, 2018

(54) METHOD FOR OPERATING TOOL IN WORKING ENVIRONMENT AND MACHINE USING SUCH METHOD

(71) Applicant: ABLE WORLD INTERNATIONAL LIMITED, Viring Islands, British (VG)

(72) Inventors: Wai-Tung Cheung, Hong Kong (HK); Chun-Hsiao Lin, New Taipei (TW); Shih-Cheng Lan, Taipei (TW); Ho-Cheung Cheung, Hong Kong (HK)

(73) Assignee: ABLE WORLD INTERNATIONAL LIMITED (VG)

( * ) Notice: Subject to any disclaimer, the term of this patent is extended or adjusted under 35 U.S.C. 154(b) by 0 days.

(21) Appl. No.: 15/319,457

(22) PCT Filed: Jul. 2, 2015

(86) PCT No.: PCT/CN2015/083173
§ 371 (c)(1),
(2) Date: Dec. 16, 2016

(87) PCT Pub. No.: WO2016/000635
PCT Pub. Date: Jan. 7, 2016

(65) Prior Publication Data
US 2017/0123764 A1    May 4, 2017

Related U.S. Application Data

(63) Continuation of application No. 14/577,772, filed on Dec. 19, 2014, now Pat. No. 9,626,157, and a
(Continued)

(51) Int. Cl.
*G06F 9/44* (2018.01)
(52) U.S. Cl.
CPC .............. *G06F 8/34* (2013.01); *G06F 8/20* (2013.01); *G06F 8/35* (2013.01); *G06F 9/4443* (2013.01)

(58) Field of Classification Search
CPC ..... G06F 8/20; G06F 8/33; G06F 8/34; G06F 8/35; G06F 9/4443
(Continued)

(56) References Cited

U.S. PATENT DOCUMENTS 6,199,195 B1    3/2001    Goodwin et al.
6,437,803 B1    8/2002    Panasyuk et al.
(Continued)

FOREIGN PATENT DOCUMENTS

CN    1525312    9/2004
CN    101814028    8/2010
(Continued)

OTHER PUBLICATIONS

Berezovskiy et al., A framework for dynamic data source identification and orchestration on the Web, 2010.
(Continued)

*Primary Examiner* — Qing Chen
(74) *Attorney, Agent, or Firm* — WPAT, PC

(57) ABSTRACT

A method for operating a tool in a working environment is provided. Firstly, a website-based working environment for operating a unified tool is provided in a browser. A software development kit is used as at least one standard interface of transmitting data and/or commands between the working environment and a unified inline frame. The software development kit is compatibly executed between the working environment and the unified inline frame. Then, the unified tool is operated in the working environment as the inline frame which is loaded with an adapter is loaded. The adapter is produced as a software module which is the integration of an original tool incompatible with the working environment and the standard interface. The original tool is executed by the working environment through the standard interface.

20 Claims, 11 Drawing Sheets

Related U.S. Application Data continuation of application No. 14/325,466, filed on Jul. 8, 2014, and a continuation of application No. 14/324,069, filed on Jul. 3, 2014, now Pat. No. 9,134,963.

(58) Field of Classification Search
USPC .......................................... 717/100, 104–113
See application file for complete search history.

(56) References Cited

U.S. PATENT DOCUMENTS

| | | | |
|---|---|---|---|
| 7,152,228 | B2 | 12/2006 | Goodwin et al. |
| 7,895,568 | B1 | 2/2011 | Goodwin et al. |
| 2002/0023261 | A1 | 2/2002 | Goodwin et al. |
| 2002/0054084 | A1 | 5/2002 | Udell |
| 2003/0058286 | A1 | 3/2003 | Dando |
| 2004/0015819 | A1 | 1/2004 | Romano-Critchley et al. |
| 2004/0243980 | A1 | 12/2004 | Das |
| 2005/0120349 | A1 | 6/2005 | Wright |
| 2005/0151835 | A1 | 7/2005 | Guo et al. |
| 2006/0236302 | A1 | 10/2006 | Bateman et al. |
| 2007/0055941 | A1 | 3/2007 | Bhakta et al. |
| 2007/0113066 | A1 | 5/2007 | Samba et al. |
| 2007/0124374 | A1 | 5/2007 | Arun et al. |
| 2008/0092116 | A1 | 4/2008 | Kulkarni et al. |
| 2009/0006553 | A1 | 1/2009 | Grandhi |
| 2009/0235230 | A1 | 9/2009 | Lucas et al. |
| 2010/0312542 | A1* | 12/2010 | Van Wyk .................. G06F 8/10 703/22 |
| 2010/0313199 | A1 | 12/2010 | Chen et al. |
| 2011/0197147 | A1 | 8/2011 | Fai |
| 2011/0246530 | A1 | 10/2011 | Malafsky |
| 2011/0282949 | A1 | 11/2011 | Rivkin |
| 2012/0054640 | A1 | 3/2012 | Nancke-Krogh |
| 2012/0060204 | A1 | 3/2012 | Panasyuk et al. |
| 2012/0089672 | A1 | 4/2012 | Saillet |
| 2012/0151373 | A1 | 6/2012 | Kominac et al. |
| 2013/0151705 | A1 | 6/2013 | Menon et al. |
| 2013/0227424 | A1 | 8/2013 | Hall et al. |
| 2013/0246901 | A1 | 9/2013 | Massand |
| 2013/0346873 | A1 | 12/2013 | Vasudev et al. |
| 2014/0024348 | A1 | 1/2014 | Hurst et al. |
| 2014/0068589 | A1 | 3/2014 | Barak |
| 2014/0157173 | A1 | 6/2014 | Takayama |
| 2014/0237375 | A1 | 8/2014 | Schachtel et al. |
| 2014/0297713 | A1 | 10/2014 | Meigen et al. |
| 2014/0324393 | A1 | 10/2014 | Alfassi et al. |

FOREIGN PATENT DOCUMENTS

| | | |
|---|---|---|
| CN | 102333114 | 1/2012 |
| CN | 102929638 | 2/2013 |
| CN | 103092980 | 5/2013 |
| CN | 103188567 | 7/2013 |
| CN | 103428525 | 12/2013 |
| CN | 103460670 | 12/2013 |
| CN | 103631598 | 3/2014 |
| CN | 103731483 | 4/2014 |
| KR | 20140021091 | 2/2014 |
| TW | 201329734 | 7/2013 |
| WO | 2011106441 | 9/2011 |

OTHER PUBLICATIONS

David Walsh, HTML5's window.postMessage API, Nov. 3, 2010, https://davidwalsh.name/window-postmessage, accessed Jan. 14, 2016, cited as XP855241277 on Extended European Search Report of EP15815428.6.

* cited by examiner

METHOD FOR OPERATING TOOL IN WORKING ENVIRONMENT AND MACHINE USING SUCH METHOD

TECHNICAL FIELD

The present invention relates to a method for driving the operation of a tool, and more particularly to a method for allowing a tool incompatible with a working environment to be operated in the working environment and a machine using the method.

BACKGROUND

In today's convenience daily life, people are accustomed to use an electronic device with computational capability to achieve various kinds of applications. For example, these applications include working, file processing, entertainment, social communication, and so on. With development of science and technology, information can be propagated more quickly. Accordingly, various web platforms, operating systems and software tools have been developed for people to use, and brought more efficient lives to the users. Especially in the post-PC era, the conventional desktop computers, tablet computers, mobile phones or other mobile devices allow people to visit the websites all over the world through the browsers therein and through internet whenever and wherever they are.

With increasing development of internet, numerous webpage developing technologies have been provided for popular applications. However, since the applications are more diverse, some incompatible problems occur. For example, a tool implemented with one framework (e.g., Angular JS) is difficult to compatibly operate in a working environment which is implemented with another framework (e.g., Famous JS) without any modification. Consequently, the tool cannot be effectively executed in the incompatible working environment. Moreover, since the tools or working environments written in different frameworks have different architectures, different naming rules or even naming conflict, it is difficult to integrate the tools with the working environments.

Moreover, although the tool and the working environment written in the same framework are compatible with each other and the tool can be executed in the working environment, some problems possibly occur. For example, someone may take an unscrupulous action (e.g., an action of stealing data or an action of jumping the webpage to another website) through the tool. In other words, there is a threat to the information security.

Therefore, there is a need of providing a method for allowing the tool written in any framework to be operated in any working environment while eliminating the threat to the information security.

SUMMARY

An object of the present invention provides a method for operating a tool in a working environment. A unified inline frame (also referred as an iframe) is generated in the working environment. Consequently, the tool incompatible with the working environment can be executed in the working environment. The method of the present invention can facilitate the integration and application of various tools while enhancing the information safety of the working environment.

In accordance with an aspect of the present invention, there is provided a method for operating a tool in a working environment. Firstly, a website-based working environment is provided in a browser so as to operate a unified tool. A software development kit provided by the working environment is used as at least one standard interface of transmitting at least one data and/or at least one command between the working environment and a unified inline frame generated in the working environment. The software development kit is compatibly executed between the working environment and the unified inline frame. Then, the unified tool is operated in the working environment. The unified tool is operated in the working environment as the inline frame which is loaded with an adapter. The adapter is produced as a software module which is the integration of an original tool incompatible with the working environment and the at least one standard interface. The original tool in the inline frame is executed by the working environment through the at least one standard interface according to a drive means of driving the unified tool.

In an embodiment, the at least one data and/or the at least one command is transmitted between the working environment and the inline frame through a PostMessage function which is defined in HTML5 web messaging specification.

In an embodiment, the at least one standard interface is a drive interface for the working environment to drive the unified tool.

In an embodiment, the original tool is integrated with the at least one standard interface by using and/or implementing a software function call, wherein the software function call is provided and/or defined by the at least one standard interface.

In an embodiment, the unified inline frame is the unified tool.

In an embodiment, the drive means is performed by transmitting an initial command to the inline frame to enable the original tool and/or transmitting a close command to the inline frame to disable the original tool.

In an embodiment, basic attributes of the unified tool include a type and a link indicating where the original tool is located.

In an embodiment, the type is used for defining a component type, and the component type and the link are used to obtain a physical component essential to the unified tool for proceeding with plugging in, managing or executing.

In an embodiment, the original tool includes a utility, a widget, an agent, an application, a service or any executable element accessible from a corresponding machine or a server.

In an embodiment, the working environment is a working environment of a workspace, and the workspace is modeled by a projectable space instance.

In an embodiment, the projectable space instance is an object, an extensible markup language document, or an instance which is instantiated with a structured language or a structured protocol.

In accordance with another aspect of the present invention, there is provided a machine. The machine includes a browser and an executing unit. A web site-based working environment for operating a unified tool is loaded into the browser. A software development kit provided by the working environment is used as at least one standard interface of transmitting at least one data and/or at least one command between the working environment and a unified inline frame generated in the working environment. The software development kit is compatibly executed between the working environment and the unified inline frame. The executing unit generates the inline frame and loads the inline frame with an adapter in the working environment, so that the unified tool is compatibly operated in the working environment as the inline frame. The adapter is produced as a software module which is the integration of an original tool incompatible with the working environment and the at least one standard interface. The original tool in the inline frame is executed by the working environment through the at least one standard interface according to a drive means of driving the unified tool.

In an embodiment, the at least one command is transmitted between the working environment and the inline frame through a PostMessage function which is defined in HTML5 web messaging specification.

In an embodiment, the at least one standard interface is a drive interface for the working environment to drive the unified tool.

In an embodiment, the original tool is integrated with the at least one standard interface by using and/or implementing a software function call, wherein the software function call is provided and/or defined by the at least one standard interface.

In an embodiment, the unified inline frame is the unified tool.

In an embodiment, the drive means is performed by transmitting an initial command to the inline frame to enable the original tool and/or transmitting a close command to the inline frame to disable the original tool.

In an embodiment, basic attributes of the unified tool include a type and a link indicating where the original tool is located.

In an embodiment, the type is used for defining a component type, and the component type and the link are used to obtain a physical component essential to the unified tool for proceeding with plugging in, managing or executing.

In an embodiment, the original tool includes a utility, a widget, an agent, an application, a service or any executable element accessible from a corresponding machine or a server.

In an embodiment, the working environment is a working environment of a workspace, and the workspace is modeled by a projectable space instance.

In an embodiment, the projectable space instance is an object, an extensible markup language document, or an instance which is instantiated with a structured language or a structured protocol.

The above objects and advantages of the present invention will become more readily apparent to those ordinarily skilled in the art after reviewing the following detailed description and accompanying drawings, in which:

DETAILED DESCRIPTION

The present invention is more fully appreciated by reference to the following description, including the following glossary of terms and the concluding examples. For the sake of brevity, the disclosures of the publications, including patents, cited in this specification are herein incorporated by reference.

The examples below are non-limiting and are merely representative of various aspects and features of the present invention. The term "information source" used herein is defined as a sequence of symbols that can be interpreted as a message in the most limited technical meaning. And the message is used for organizing and labeling information. For example, the information source includes website (such as internet service), intranet, social network, software, electronic book, database and other media of information (such as storage media of non-transitory computer or storage media of mobile device). The term "original information" used herein is a file, a webpage, a database row, a policy, a rule or any data accessible in corresponding machines and servers, but is not limited thereto. The term "original tool" used herein is a utility, a widget, an intelligent agent, an application, a service or any executable component accessible in corresponding machines and servers, but is not limited thereto. It is noted that the information sources, the original information and the original tool are not restricted to the above examples.

Moreover, "original information" and "original tool" are implementation examples of "original matters" used herein. In accordance with the present invention, a plurality of "original matters" from identical or different "information sources" are modeled to a plurality of "unified matters" by a unifying method. Consequently, the "unified matters" in the same execution environment are compatible with each other and cooperate to perform a specified task. The "unified tool" and the "unified information unit" are implementation examples of the "unified matters". Moreover, the term "Matterizer" used herein is a means, a device or a program code to perform the unifying process.

In an embodiment, the above unifying method comprises steps of: modeling at least one original information obtained from at least one information source of multiple information sources into a unified information unit with one unified data model via re-organizing the original information, and/or modeling at least one original tool obtained from at least one information source of multiple information sources into a unified tool with another unified data model via re-organizing the original tool. The one unified data model and another unified data model could be identical or different, and the unifying method described above could be completed through a matterizer.

Figure 1:
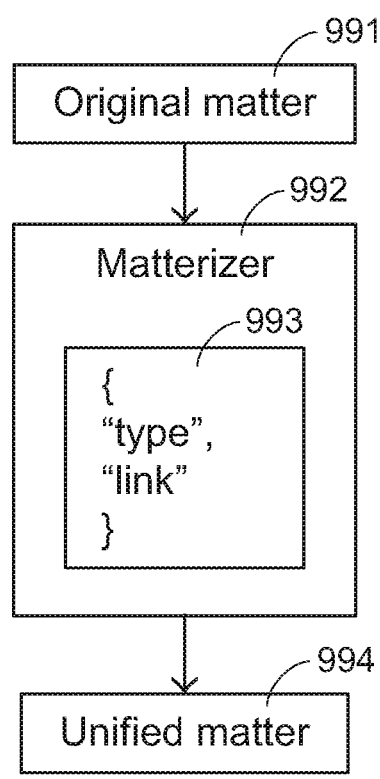
FIG. 1 is a schematic diagram illustrating an implementation concept of a unifying method according to an embodiment.

Please refer to FIG. 1. FIG. 1 is a schematic diagram illustrating an implementation concept of a unifying method according to an embodiment. As shown in FIG. 1, the matterizer 992 re-organizes an attribute and a link of an original matter 991 with a unified data model 993, and thus models the original matter 991 into a unified matter 994. Consequently, the basic attributes of the unified matter 994 include a type of the original matter 994 and a link indicating where the original matter 994 is located.

In this embodiment, the original matter 991 at least includes an original information (not shown) or an original tool (not shown), but is not limited thereto. In the above unifying method, if the attribute accessible from the original information corresponds to the attribute to be unified in the unified information unit, the unified information unit is directly produced through the matterizer 992. If the attribute accessible from the original information does not correspond to the attribute to be unified in the unified information unit, the original information is firstly re-defined by logically re-organizing the attributes and the link of the original information, and then the original information is converted into a new original information with the attributes which correspond to attributes to be unified in the unified information unit. Consequently, the unified information unit is indirectly produced.

Moreover, the type of the unified tool is used for defining a component type. The component type of the unified tool and the link where the unified tool is located are used to obtain a physical component essential to the unified tool for proceeding with plugging in, managing or executing. Moreover, if the original tool is compatible with the working environment of the workspace, the unified tool is directly produced by the matterizer 992. On the other hand, if the original tool is incompatible with the working environment of the workspace, the unified tool is indirectly produced via an adapter and/or a software development kit (SDK) of the original tool to drive the original tool. The adapter provides an interface implementation compatible with the working environment.

Herein, "the descriptions of the unifying method", "the methods of obtaining the unified matters" and "the descriptions of the matterizer" may be referred to the U.S. patent application Ser. No. 14/324,069, entitled "A method of unifying information and tool from a plurality of information sources", and also referred to the China Patent Application No. 201410768564.X, which claims the benefit of priority to the U.S. patent application Ser. No. 14/324,069 and is entitled "A method of unifying information and tool from a plurality of information sources and computer product and device using the method". The detailed descriptions thereof are omitted.

The above unifying method is presented herein for purpose of illustration and description only. The method of unifying a plurality of original matters from different information sources is not restricted. However, those skilled in the art will readily observe that numerous modifications and alterations may be made while retaining the teachings of the invention.

Hereinafter, two other unifying methods will be illustrated. The first unifying method is applied to a method of unifying the information of Garmin satellite navigation. Through a point-of-interest (POI) function of the Garmin satellite navigation, the method of unifying the information is employed to unify the imported original point information (i.e., an original information) into the corresponding unified point information (i.e., a unified information unit). The second unifying method is applied to a method of unifying the tool of an Android system. The Android system is a Linux-based open source mobile operating system. However, most application programs (i.e., original tools) are written in the Java programming language. Consequently, the application program (i.e., the original tool) written in the Java programming language can be modeled into a unified application program (i.e., the unified tool) compatible with the Android system so as to be executed in the Android system.

Figure 6:
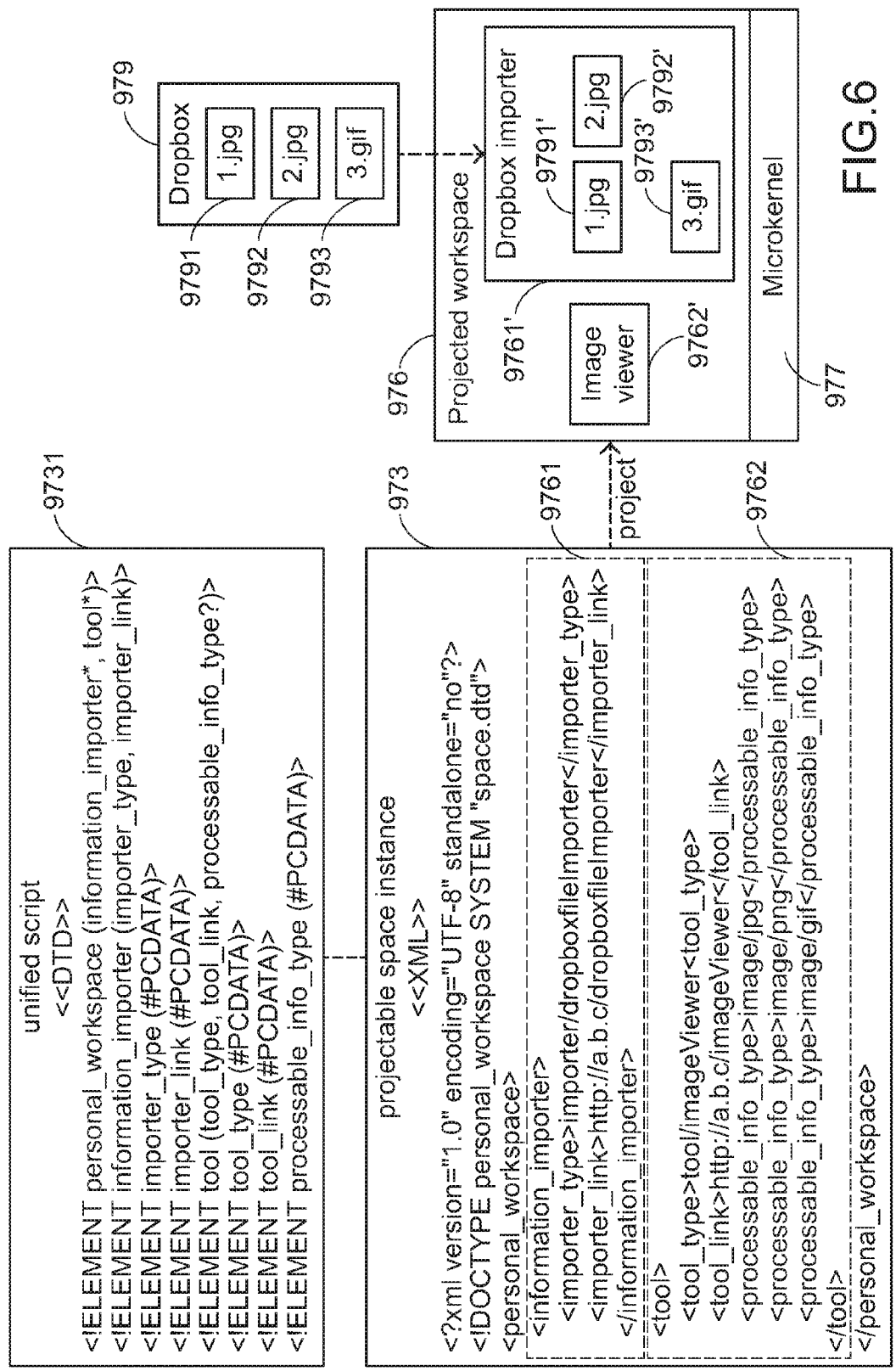
FIG. 6 is a schematic diagram illustrating the relationship between a projectable space instance as shown in FIG. 4 and a projected workspace as shown in FIG. 5B.

The term "workspace" used herein is a working environment for providing interactions between the at least one matterizer, the at least one tool and/or the at least one information so as to implement a specified task. Moreover, the at least one tool and/or at least one information can be imported into the workspace through the at least one matterizer. However, the way of importing the information and/or tool into the workspace is not restricted. Hereinafter, information importers such as the information importers 9881, 9882 and 9883 of FIG. 2 and the Dropbox importer 9761' of FIG. 6 are some examples of the matterizer. The term "unified script" used herein is an intermediate language to implement the workspace. Moreover, via the "unified script", the at least one matterizer, the at least one tool and/or the at least one information can be provided to the workspace (e.g., built in or plugged in the workspace).

In an embodiment, the above at least one information is a unified information unit which is produced after at least one original information obtained from at least one information source is unified, and the above at least one tool is a unified tool which is produced after at least one original tool obtained from at least one information source is unified. Moreover, according to different tasks, the required unified information unit and/or the required unified tool from the corresponding information source can be added to the personal workspace (e.g., built in or plugged in the personal workspace). In other words, the "workspace" is a user-orientated "personal workspace".

Figure 2:
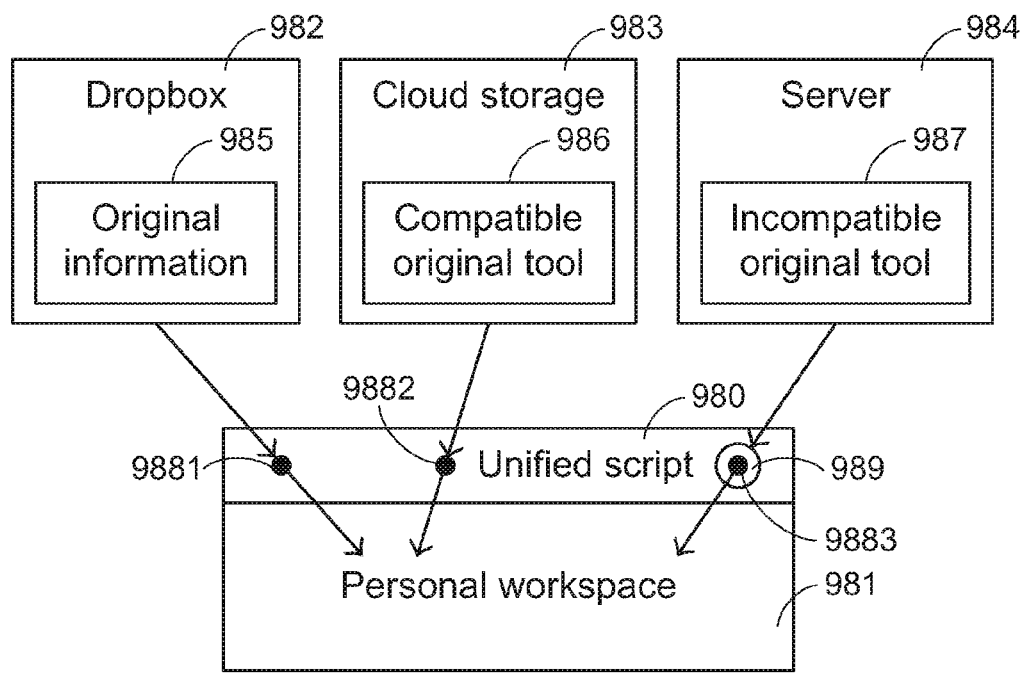
FIG. 2 is a schematic diagram illustrating an implementation concept of using the unified script as an intermediate language for implementing the personal workspace.
Figure 3:
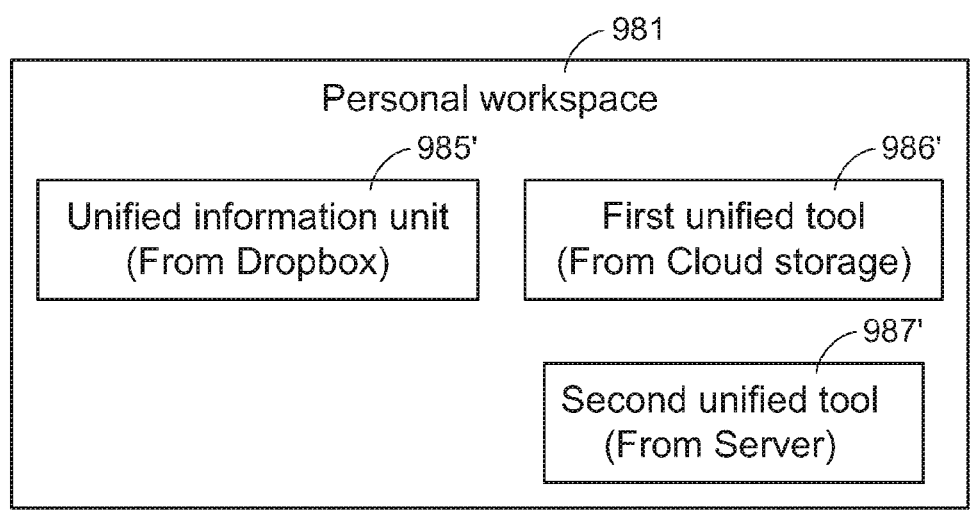
FIG. 3 is a schematic diagram illustrating a preferred configuration of a personal workspace.

Please refer to FIG. 2 and FIG. 3. FIG. 2 is a schematic diagram illustrating an implementation concept of using the unified script as an intermediate language for implementing the personal workspace. FIG. 3 is a schematic diagram illustrating a preferred configuration of a personal workspace. As shown in FIG. 2 and FIG. 3, a unified information unit 985' corresponding to an original information 985 in Dropbox 982, a first unified tool 986' corresponding to a compatible original tool 986 in a cloud storage 983 and a second unified tool 987' corresponding to an incompatible original tool 987 in a server 984 are combined together into a personal workspace 981 according to the required tasks. In particular, a unified script 980 which is regarded as an intermediate language for implementing the personal workspace 981 is firstly compiled, and then an information importer 9881 of the Dropbox 982, an information importer 9882 of the cloud storage 983 and an information importer 9883 of the server 984 are configured through the unified script 980. Moreover, after the original information 985 in the Dropbox 982 is unified into the unified information unit 985' by the information importer 9881, the unified information unit 985' is imported into the personal workspace 981.

As shown in FIG. 2 and FIG. 3, the original tool stored in the cloud storage 983 is the compatible original tool 986, which is compatible with the component architecture of the unified tool in the personal workspace 981. Moreover, the first unified tool 986' corresponding to the compatible original tool 986 is directly provided to the personal workspace 981 through the information importer 9882 of the unified script 980.

As shown in FIG. 2 and FIG. 3, the original tool stored in the server 984 is the incompatible original tool 987, which is incompatible with the component architecture of the unified tool in the personal workspace 981. Moreover, the second unified tool 987' corresponding to the incompatible original tool 987 is provided to the personal workspace 981 through the compatible adapter 989 and the information importer 9883 of the unified script 980.

As shown in FIG. 3, the user can configure and arrange (e.g., group or place) the unified information unit 985', the first unified tool 986' and the second unified tool 987' in a specific area of the personal workspace 981 according to the practical requirements. Moreover, according to the operational relationship between the unified tool and the unified information unit (e.g., the clicking or dragging actions between the two), the user can perform specified tasks by using the unified tool to access or control the corresponding unified information unit.

Herein, "the descriptions of using the unified script as the intermediate language for implementing the personal workspace" and "the descriptions of allowing the required unified information unit and/or the required unified tool from the corresponding information sources to be arbitrarily combined together into the personal workspace according to the practical requirements" may be referred to the U.S. patent application Ser. No. 14/325,466, entitled "Method for performing task on unified information units in a personal workspace", and also referred to the China Patent Application No. 201410796528.4, which claims the benefit of priority to the U.S. patent application Ser. Nos. 14/324,069 and 14/325,466 and is entitled "A method of combining unified matters in a personal workspace and computer product and device using the method". The detailed descriptions thereof are omitted.

The above personal workspace is presented herein for purpose of illustration and description only. It is noted that the workspace used in the present invention is not restricted. For example, the unified script as the intermediate language for implementing the workspace can be previously edited. Consequently, the workspace equips the default matterizer, the default information and/or the default tool. This workspace is not limited to be operated by a single user. According to the practical requirements, this workspace can be operated by multiple users at the same time or at different times.

Moreover, the "workspace" used herein is obtained by "a method of projecting a workspace" to any electronic device with computational capability. An example of the electronic device includes but is not limited to a mobile phone, a tablet computer, a notebook computer or a desktop computer. Consequently, the "projected workspace" can be operated by any user through any electronic device with computational capability.

In an embodiment, the method of projecting the workspace comprises the following steps. Firstly, a projectable space instance instantiated by the unified script is obtained through a uniform resource identifier (URI). As mentioned above, the unified script is defined to configure at least one of the matterizer, the information and the tool to model the workspace. Moreover, the projectable space instance is used to build the projected workspace corresponding to the workspace, and thus provide an interface for operating at least one of the matterizer, the information and the tool to implement a task. Then, a projector parses the projectable space instance and build a working environment to configure at least one of the matterizer, the information and the tool so as to execute the projected workspace for providing interactions between at least one user and the projected workspace.

The projector is acquired from a remote data station, the projectable space instance or a preloaded application program, and loaded to an engine for providing a compatible environment to execute the projector. An example of the engine includes but is not limited to a Javascript engine, a Windows application or a Linux application. Preferably but not exclusively, the united script can be declared by a document type definition (DTD), an extensible markup language (XML) Schema, a structured language or a structured protocol. Preferably but not exclusively, the projectable space instance is an object, an extensible markup language (XML) document, or an instance instantiated with a structured language or a structured protocol.

Figure 4:
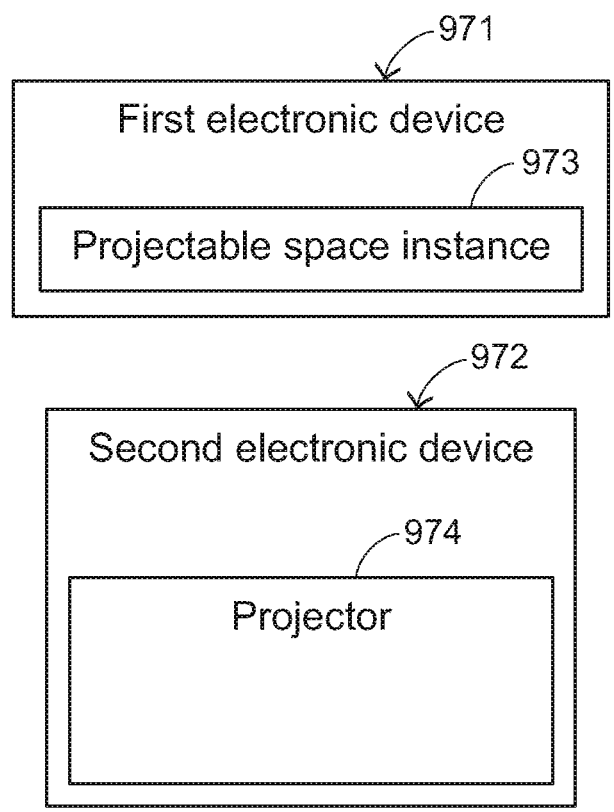
FIG. 4 is a schematic diagram illustrating an initial state of the method of projecting the workspace according to an embodiment of the present invention.
Figure 5A:
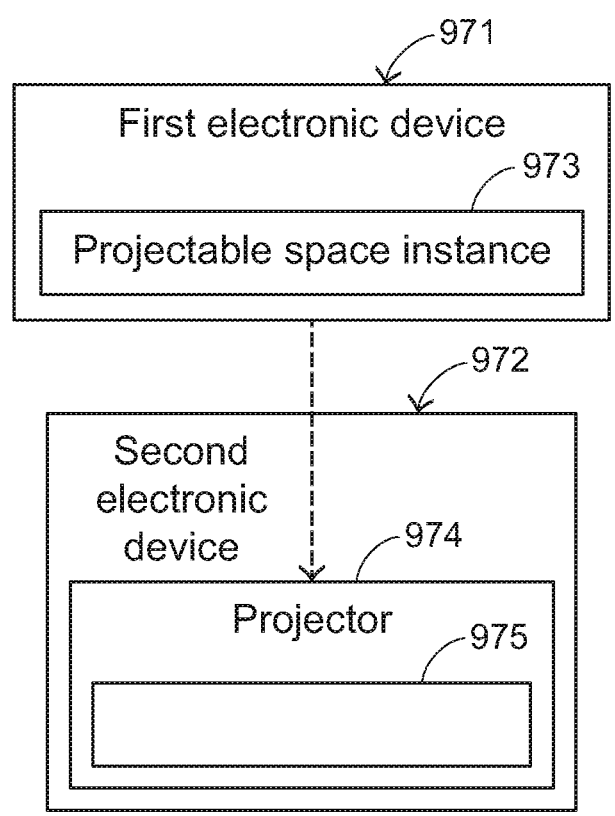
FIGS. 5A and 5B are schematic diagrams illustrating operating concepts of the method of projecting the workspace as shown in FIG. 4.
Figure 5B:
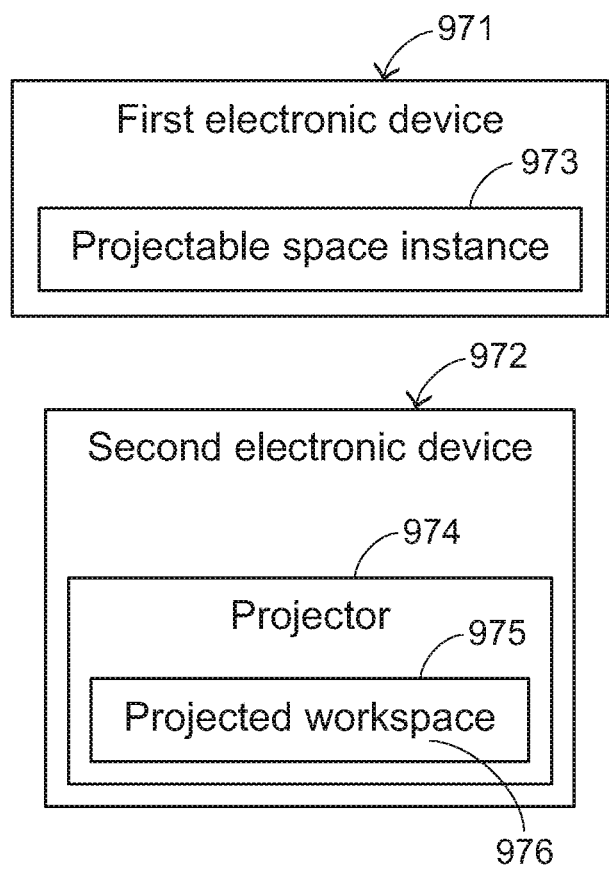

Please refer to FIG. 4, FIG. 5A, FIG. 5B and FIG. 6. FIG. 4 is a schematic diagram illustrating an initial state of the method of projecting the workspace according to an embodiment of the present invention. FIGS. 5A and 5B are schematic diagrams illustrating operating concepts of the method of projecting the workspace as shown in FIG. 4. FIG. 6 is a schematic diagram illustrating the relationship between a projectable space instance as shown in FIG. 4 and a projected workspace as shown in FIG. 5B.

In the initial state of FIG. 4, a first electronic device 971 and a second electronic device 972 are in communication with each other (e.g., through network connection). Moreover, the first electronic device 971 stores a projectable space instance 973, and the second electronic device 972 has a built-in projector 974.

In this embodiment, the united script 9731 is declared by a document type definition (DTD) and defined to configure at least one information importer (i.e., an example of the matterizer), at least one unified information unit and/or at least one unified tool to model a workspace, and the projectable space instance 973 is an instance instantiated with the extensible markup language (XML). As shown in FIG. 6, the projectable space instance 973 is used for building a projected workspace 976 corresponding to the workspace. Moreover, the information importer, the unified information and/or the unified tool is allowed to be added to or removed from the projectable space instance 973.

The projector 974 of the second electronic device 972 will build a working environment 975 in the second electronic device 972 for executing the projected workspace 976. In addition, the projector 974 provides a microkernel 977 (see FIG. 6) to the working environment 975 for equipping at least one information importer, at least one unified information and/or at least one unified tool that will be added to the projected workspace 976. When the second electronic device 972 acquires the projectable space instance 973 from the first electronic device 971 through a URI, the projector 974 of the second electronic device 972 starts to parse the projectable space instance 973 (see FIG. 5A). After the projectable space instance 973 is parsed by the projector 974, the projected workspace 976 is built in the working environment 975 according to parsed contents of the projectable space instance 973 (see FIG. 5B). Accordingly, a user of the second electronic device 972 can interact with the projected workspace 976 through the second electronic device 972 so as to perform related tasks.

The relationships between the unified script 9731, the projectable space instance 973 and the projected workspace 976 will be illustrated in more detailed through a usage situation as shown in FIG. 6. The usage situation as shown in FIG. 6 is related to a process of building a projected workspace that is capable of accessing jpg format image files and gif format image files from a specified internet space and allowing the image files to be viewed by a user. In this usage situation, the unified script 9731 is declared by the Document Type Definition (DTD), and the projectable space instance 973 is instantiated with XML.

Moreover, an information importer and a unified tool are added into the projectable space instance 973, and at least one unified information unit corresponding to the original information is imported into the projected workspace 976 through the information importer. In this usage situation, the information importer is a Dropbox importer. The information of the Dropbox importer is disclosed in the dashed line frame 9761 of FIG. 6. The original information includes a jpg format image file 9791, a jpg format image file 9792 and a gif format image file 9793 in Dropbox 979 (i.e., an information source). The unified information units include a unified jpg format image file 9791', a unified jpg format image file 9792' and a unified gif format image file 9793', which will be described later. The unified tool is an image viewer for accessing image files which are imported into the projected workspace 976. The information of the image viewer is disclosed in the dashed line frame 9762 of FIG. 6.

As mentioned above, the projected workspace 976 is built after the projectable space instance 973 is parsed by the projector 974 of the second electronic device 972. In this embodiment, the Dropbox importer 9761' corresponding to the dashed line frame 9761 and the image viewer 9762' corresponding to the dashed line frame 9762 are configured in the projected workspace 976. Moreover, the jpg format image file 9791, the jpg format image file 9792 and the gif format image file 9793 in Dropbox 979 are unified and imported into the projected workspace 976 by the Dropbox importer 9761'. Consequently, the unified jpg format image file 9791' corresponding to the jpg format image file 9791, the unified jpg format image file 9792' corresponding to the jpg format image file 9792 and the unified gif format image file 9793' corresponding to the gif format image file 9793 are displayed on the projected workspace 976. When the user of the second electronic device 972 manipulates any of the unified image files 9791', 9792' and 9793' by any specified operating means (such as an action of clicking any of the unified images files 9791', 9792' and 9793' or an action of dragging and dropping any of the image files 9791', 9792' and 9793' to the image viewer 9762'), the image viewer 9762' will access the contents of the corresponding unified image files 9791', 9792' or 9793' to allow the unified image files 9791', 9792' or 9793' to be viewed by the user. Moreover, the Dropbox importer 9761' and the image viewer 9762' mentioned above are equipped by the microkernel 977.

It is noted that the URI of the projectable space instance 973 may be a HTTP (hypertext transfer protocol) URI or a FTP (file transfer protocol) URI. In case that the first electronic device 971 and the second electronic device 972 are integrated into one device, the URI of the projectable space instance 973 can also be a local file URI. However, the types of the URI of the projectable space instance 973 are not restricted.

Herein, "the descriptions of the method of projecting the workspace" may be referred to the U.S. patent application Ser. No. 14/324,069, entitled "Method of projecting a workspace and system using the same", and also referred to the China Patent Application No. 201410814138.5, which claims the benefit of priority to the U.S. patent application Ser. Nos. 14/324,069, 14/325,466 and 14/577,772 and is entitled "Method of projecting a workspace and system using the same". The detailed descriptions thereof are omitted.

The above method of projecting the workspace to any electronic device with computational capability is presented herein for purpose of illustration and description only. The method of projecting the workspace to any electronic device with computational capability is not restricted. However, those skilled in the art will readily observe that numerous modifications and alterations may be made while retaining the teachings of the invention.

Figure 7:
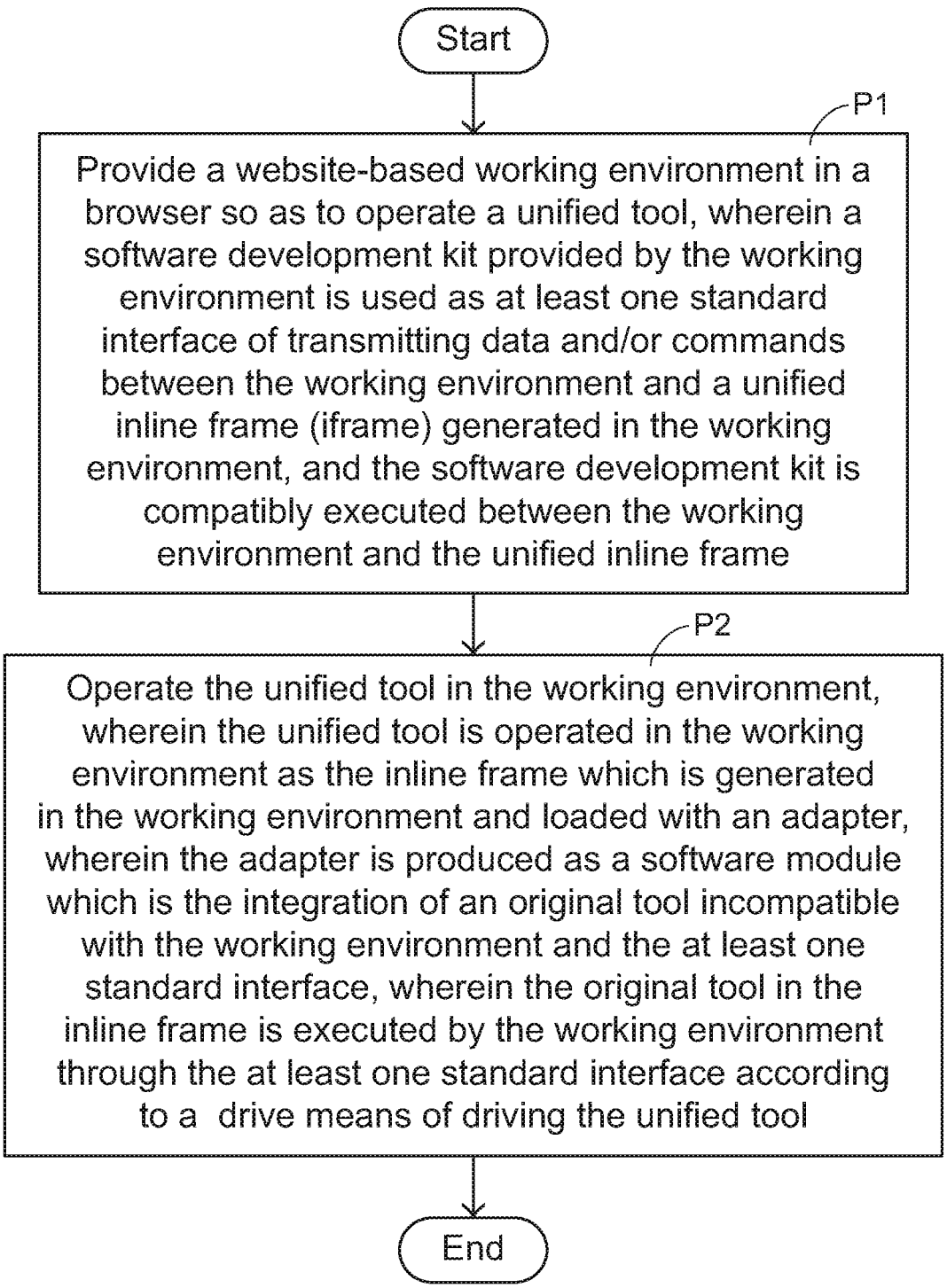
FIG. 7 is a schematic diagram illustrating a flowchart of a method for operating a tool in a working environment according to an embodiment of the present invention.

In case that the original tool is incompatible with the working environment, the present invention provides a method for converting the original tool into a unified tool and operating the unified tool in the working environment. FIG. 7 is a schematic diagram illustrating a flowchart of a method for operating a tool in a working environment according to an embodiment of the present invention. The method for executing the tool in the working environment comprises the following steps:

Step P1: Provide a website-based working environment in a browser so as to operate a unified tool, wherein a software development kit provided by the working environment is used as at least one standard interface of transmitting data and/or commands between the working environment and a unified inline frame (iframe) generated in the working environment, and the software development kit is compatibly executed between the working environment and the unified inline frame; and Step P2: Operate the unified tool in the working environment, wherein the unified tool is operated in the working environment as the inline frame which is generated in the working environment and loaded with an adapter, wherein the adapter is produced as a software module which is the integration of an original tool incompatible with the working environment and the at least one standard interface, wherein the original tool in the inline frame is executed by the working environment through the at least one standard interface according to a drive means of driving the unified tool.

An implementation example of the method for operating the tool in the working environment will be illustrated as follows. In this embodiment, the working environment is a working environment of a workspace. The original tool incompatible with the working environment is a calculator from a tool cloud. The examples of the working environment and the original tool are not restricted. However, those skilled in the art will readily observe that numerous modifications and alterations may be made while retaining the teachings of the invention.

Figure 8:
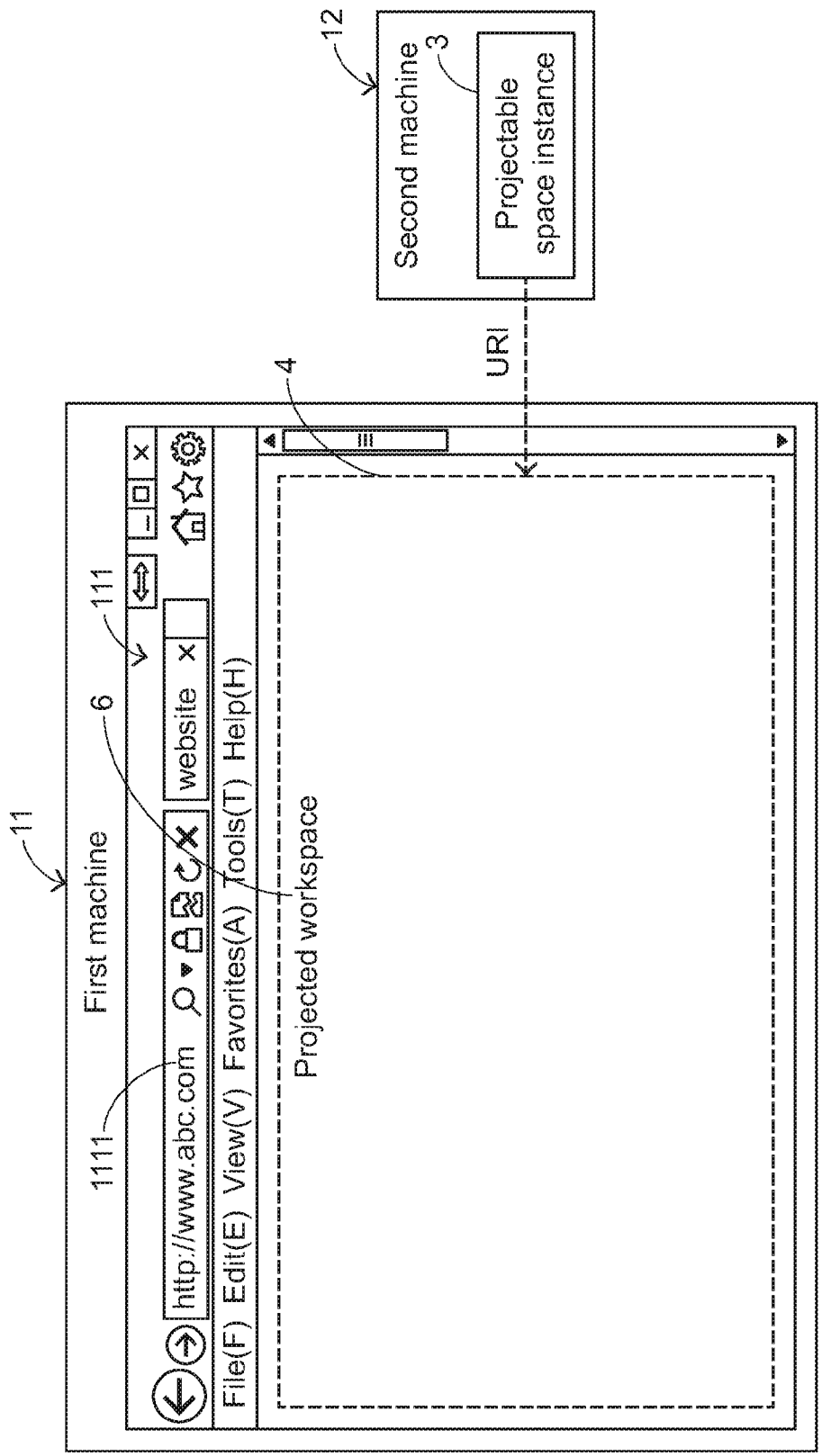
FIG. 8 is a schematic diagram illustrating the implementation concept of providing a web site-based working environment in a browser so as to operate a unified tool according to the step P1 of FIG. 7.

FIG. 8 is a schematic diagram illustrating the implementation concept of providing a web site-based working environment in a browser so as to operate a unified tool according to the step P1 of FIG. 7. As shown in FIG. 8, a first machine 11 has a browser 111 for providing a compatible environment to execute the projector as shown in FIGS. 5A and 5B. A second machine 12 has a projectable space instance 3 for modelling a workspace. After the first machine 11 acquires the projectable space instance 3 through a uniform resource identifier (URI) 1111 of the projectable space instance 3, a projector (not shown in FIG. 8, see FIGS. 5A and 5B) will build a working environment 4 for executing a projected workspace 6 in the browser 111. In addition, the projector provides a microkernel (not shown in FIG. 8, see FIG. 6) corresponding to the workspace in order for equipping unified matters that are compiled in the projectable space instance 3.

Figure 9:
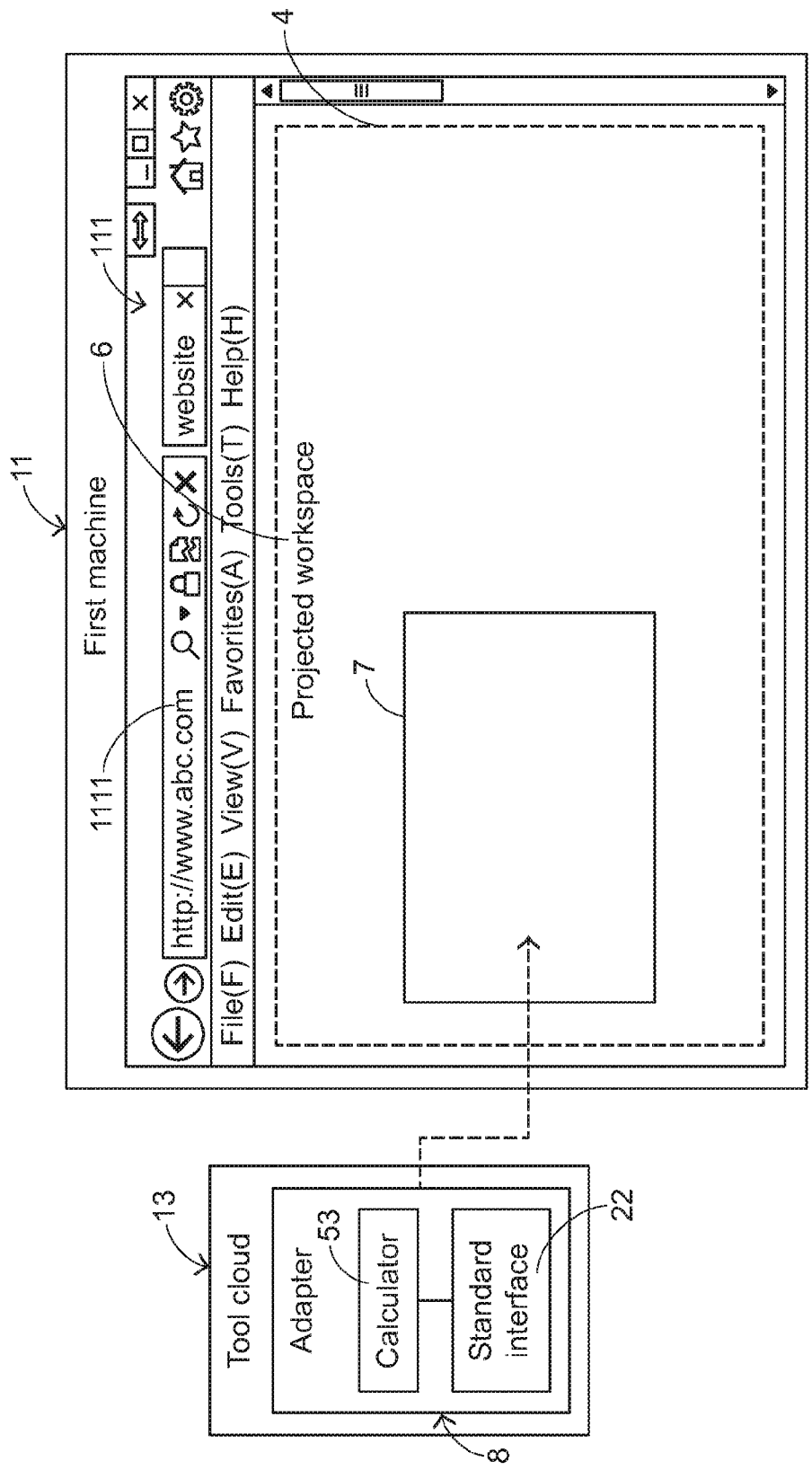
FIG. 9 is a schematic diagram illustrating the implementation concept of generating an inline frame in the working environment and loading an adapter into the inline frame according to the step P2 of FIG. 7.

FIG. 9 is a schematic diagram illustrating the implementation concept of generating an inline frame in the working environment and loading an adapter into the inline frame according to the step P2 of FIG. 7. As shown in FIG. 9, a calculator 52 incompatible with the working environment 4 is disposed within a tool cloud 13. For executing the calculator 53 in the projected workspace 6, an inline frame 7 is generated in the working environment 4 and an adapter 8 corresponding to the calculator 53 is loaded with the inline frame 7. In particular, a software development kit 21 (see FIG. 10) provided by the working environment 4 is used as a standard interface 22 of transmitting data and/or commands between the working environment 4 and the inline frame 7 so as to previously integrate the calculator 53 with the standard interface 22. The software development kit 21 is compatibly executed between the working environment 4 and the inline frame 7. In an embodiment, the calculator 53 is integrated with the standard interface 22 by using and/or implementing a software function call, wherein the software function call is provided and/or defined by the standard interface 22. The integrating method is well known to those skilled in the art, and is not redundantly described herein. Moreover, the method of integrating the calculator 53 with the standard interface 22 is not restricted.

Moreover, a software module produced by previously integrating the calculator 53 and the standard interface 22 is an adapter 8. After the projectable space instance 3 is parsed by the projector (not shown in FIG. 9, see FIGS. 5A and 5B), the calculator 53 of the tool cloud 13 is configured in the projected workspace 6 according to the parsed contents of the projectable space instance 3. Consequently, the adapter 8 is loaded with the inline frame 7 and used as a unified tool 51, which is operated in the working environment 4. In particular, the standard interface 22 is a drive interface for the working environment 4 to drive the unified tool 51. Under this circumstance, the working environment 4 can drive the unified tool 51 in order to execute the calculator 53 in the inline frame 7. On the other hand, the unified inline frame as described in the step P1 of FIG. 7 is the unified tool 51.

Figure 10:
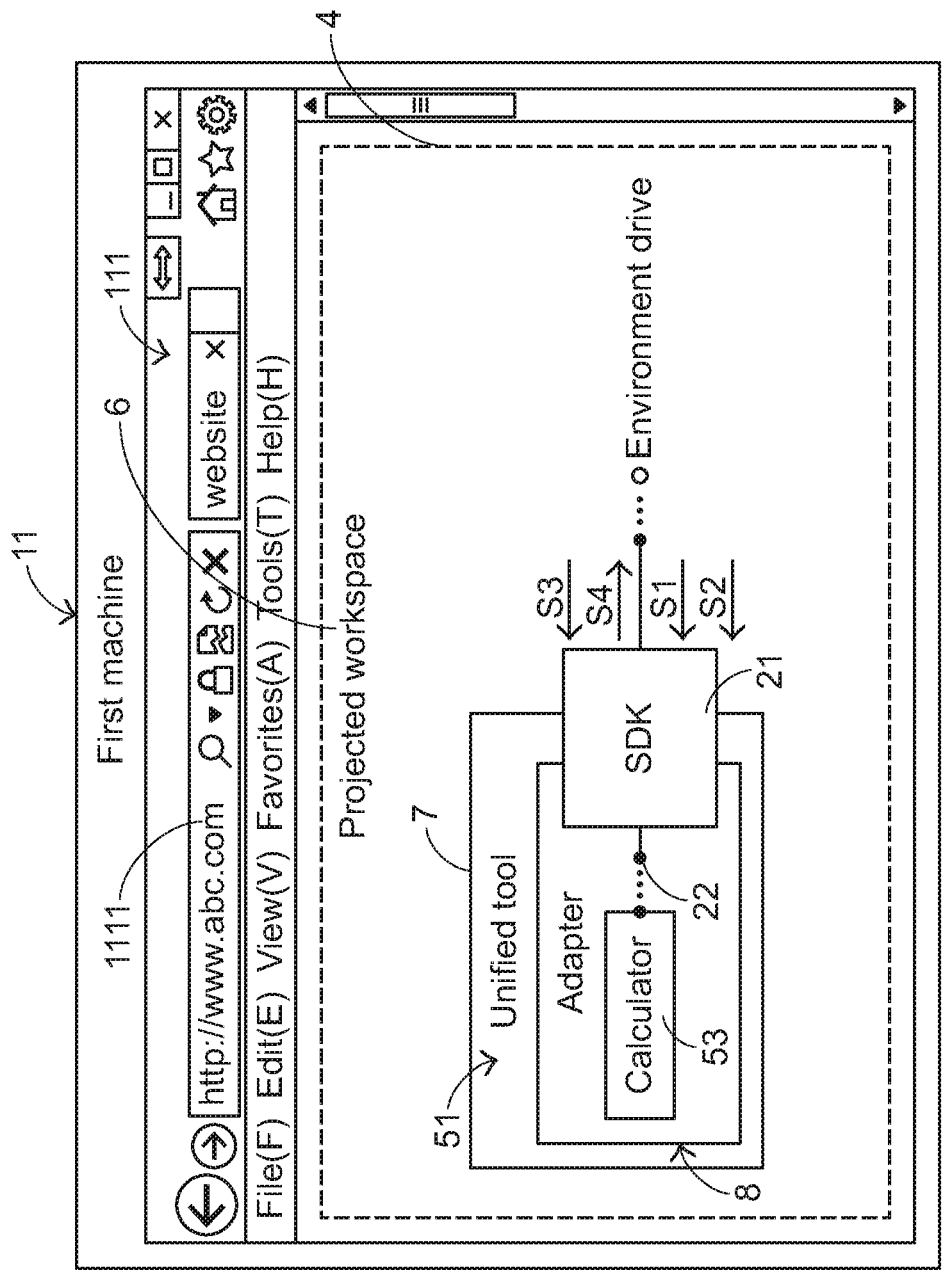
FIG. 10 is a schematic diagram illustrating an implementation concept of executing the calculator in the working environment.

FIG. 10 is a schematic diagram illustrating an implementation concept of executing the calculator in the working environment. In this embodiment, any data and/or command is transmitted between the working environment 4 and the inline frame 7 through a PostMessage function, but not limited to. And the PostMessage function is defined in HTML5 web messaging specification. For executing the calculator 53 in the inline frame 7 by the working environment 4, an initial command S1 is firstly transmitted to the inline frame 7. According to the initial command S1, the calculator 53 in the inline frame 7 is enabled. Meanwhile, the initial state of the calculator 53 is zeroed. Then, if a calculation instruction set S3 (e.g., "5+2") is transmitted from the working environment 4 to the inline frame 7 and received by the calculator 53, the calculator 53 will perform calculation. Consequently, a result information S4 (e.g. "7") is transmitted back to the working environment 4 from the inline frame 7. Then, for disabling the calculator 53 in the inline frame 7 by the working environment 4, a close command S2 is transmitted to the inline frame 7. According to the close command S2, the calculator 53 is disabled.

From the above descriptions, any tool incompatible with the working environment can be executed in the working environment according to the method of the present invention. Consequently, the method of the present invention can facilitate the integration and application of various tools. The above working environment is illustrated by taking the working environment of the workspace as an example. It is noted that the type of the working environment used in the present invention is not restricted.

According to the method of the present invention, the inline frame is generated in the working environment, and the adapter integrating the original tool and the standard interface is loaded with the inline frame. Consequently, the tool incompatible with the working environment can be executed in the working environment. Under this circumstance, if someone intends to take an unscrupulous action (e.g., an action of stealing data or an action of jumping the webpage to another website) through the tool, only the inline frame is damaged but the working environment is not adversely affected. Consequently, the threat to the information security is eliminated.

Figure 11:
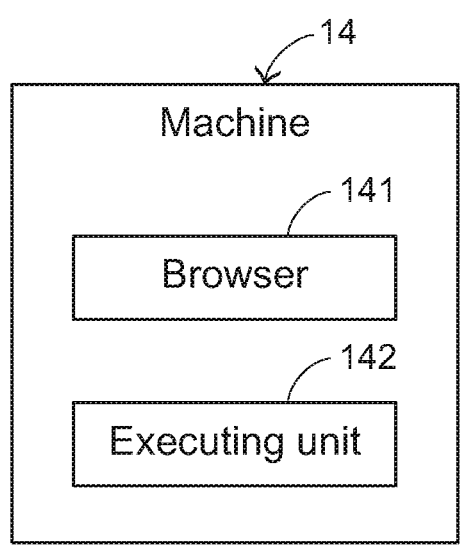
FIG. 11 is a schematic functional diagram illustrating a machine using the method of FIG. 7 according to an embodiment of the present invention.

FIG. 11 is a schematic functional diagram illustrating a machine using the method of FIG. 7 according to an embodiment of the present invention. As shown in FIG. 11, the machine 14 comprises a browser 141 and an executing unit 142. A website-based working environment for operating a unified tool is loaded into the browser 141. The executing unit 142 is used for generating the inline frame in the working environment which is loaded with an adapter to produce a unified tool compatibly operated in the working environment. A software development kit provided by the working environment is used as at least one standard interface of transmitting at least one data and/or at least one command between the working environment and the unified inline frame. In addition, the software development kit is compatibly executed between the working environment and the inline frame. The adapter is produced as a software module which is the integration of an original tool incompatible with the working environment and the at least one standard interface. The original tool in the inline frame is executed by the working environment through the at least one standard interface according to a drive means of driving the unified tool. The details operations of the machine are similar to those depicted in FIGS. 7-10, and are not redundantly described herein.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for operating a tool in a web site-based working environment, the method comprising steps of:
providing a website-based working environment in a browser so as to operate a unified tool, wherein a software development kit provided by the website-based working environment is used as at least one standard interface of transmitting at least one data and/or at least one command between the website-based working environment and a unified inline frame generated in the website-based working environment, and wherein the software development kit is compatibly executed between the website-based working environment and a unified inline frame; and operating the unified tool in the website-based working environment, wherein the unified tool is operated in the website-based working environment as the unified inline frame which is generated in the website-based working environment and loaded with an adapter, wherein the adapter is produced as a software module which is an integration of an original tool incompatible with the website-based working environment and the at least one standard interface, and wherein the original tool in the unified inline frame is executed by the website-based working environment through the at least one standard interface according to a drive means of driving the unified tool.

2. The method according to claim 1, wherein the at least one data and/or the at least one command is transmitted between the website-based working environment and the unified inline frame through a PostMessage function which is defined in HTML5 web messaging specification.

3. The method according to claim 1, wherein the at least one standard interface is a drive interface for the website-based working environment to drive the unified tool, wherein the original tool is integrated with the at least one standard interface by using and/or implementing a software function call, and wherein the software function call is provided and/or defined by the at least one standard interface.

4. The method according to claim 1, wherein the unified inline frame is the unified tool.

5. The method according to claim 1, wherein the drive means is performed by transmitting an initial command to the unified inline frame to enable the original tool and/or transmitting a close command to the unified inline frame to disable the original tool.

6. The method according to claim 1, wherein basic attributes of the unified tool include a type and a link indicating where the original tool is located.

7. The method according to claim 6, wherein the type is used for defining a component type, and wherein the component type and the link are used to obtain a physical component essential to the unified tool for proceeding with plugging in, managing, or executing.

8. The method according to claim 1, wherein the original tool includes a utility, a widget, an agent, an application, a service, or any executable element accessible from a corresponding machine or a server.

9. The method according to claim 1, wherein the website-based working environment is a website-based working environment of a workspace, and the workspace is modeled by a projectable space instance.

10. The method according to claim 9, wherein the projectable space instance is an object, an extensible markup language document, or an instance which is instantiated with a structured language or a structured protocol.

11. A machine, comprising:
a browser, wherein a website-based working environment for operating a unified tool is loaded into the browser, wherein a software development kit provided by the website-based working environment is used as at least one standard interface of transmitting at least one data and/or at least one command between the website-based working environment and a unified inline frame generated in the website-based working environment, and wherein the software development kit is compatibly executed between the website-based working environment and a unified inline frame; and
an executing unit configured to generate the unified inline frame and loading the unified inline frame with an adapter in the website-based working environment to produce the unified tool which is compatibly executed in the website-based working environment, wherein the adapter is produced as a software module which is an integration of an original tool incompatible with the website-based working environment and the at least one standard interface, and wherein the original tool in the unified inline frame is executed by the website-based working environment through the at least one standard interface according to a drive means of driving the unified tool.

12. The machine according to claim 11, wherein the at least one data and/or the at least one command is transmitted between the website-based working environment and the unified inline frame through a PostMessage function which is defined in HTML5 web messaging specification.

13. The machine according to claim 11, wherein the at least one standard interface is a drive interface for the website-based working environment to drive the unified tool, wherein the original tool is integrated with the at least one standard interface by using and/or implementing a software function call, and wherein the software function call is provided and/or defined by the at least one standard interface.

14. The machine according to claim 11, wherein the unified inline frame is the unified tool.

15. The machine according to claim 11, wherein the drive means is performed by transmitting an initial command to the unified inline frame to enable the original tool and/or transmitting a close command to the unified inline frame to disable the original tool.

16. The machine according to claim 11, wherein basic attributes of the unified tool include a type and a link indicating where the original tool is located.

17. The machine according to claim 16, wherein the type is used for defining a component type, and wherein the component type and the link are used to obtain a physical component essential to the unified tool for proceeding with plugging in, managing, or executing.

18. The machine according to claim 11, wherein the original tool includes a utility, a widget, an agent, an application, a service, or any executable element accessible from a corresponding machine or a server.

19. The machine according to claim 11, wherein the website-based working environment is a website-based working environment of a workspace, and the workspace is modeled by a projectable space instance.

20. The machine according to claim 11, wherein the projectable space instance is an object, an extensible markup language document, or an instance which is instantiated with a structured language or a structured protocol.

* * * * *